United States Patent [19]
Wilkinson

[11] Patent Number: 5,579,181
[45] Date of Patent: Nov. 26, 1996

[54] APPARATUS FOR PROCESSING REPRODUCED DATA INCLUDING TWO MULTIPLEXERS THE FIRST OF WHICH IS RESPONSIVE TO REPRODUCED FIELD INFORMATION

[75] Inventor: James H. Wilkinson, Tadley, United Kingdom

[73] Assignees: Sony Corporation, Tokyo, Japan; Sony United Kingdom Limited, Weybridge, England

[21] Appl. No.: 70,193

[22] Filed: Jun. 2, 1993

[30] Foreign Application Priority Data

Jul. 6, 1992 [GB] United Kingdom ............... 9214331

[51] Int. Cl.$^6$ ............................................. H04N 5/78
[52] U.S. Cl. .................. 386/46; 386/124; 386/95; 360/24
[58] Field of Search ..................... 360/33.1, 32, 24, 360/36.1, 38.1, 18; 358/335, 13, 336

[56] References Cited

U.S. PATENT DOCUMENTS 4,364,081 12/1982 Hashimoto et al. ............... 358/13
4,463,387 7/1984 Hashimoto et al. ............... 360/32 X

FOREIGN PATENT DOCUMENTS 2140189 11/1984 United Kingdom .

*Primary Examiner*—Andrew L. Sniezek
*Attorney, Agent, or Firm*—William S. Frommer; Alvin Sinderbrand

[57] ABSTRACT

Apparatus is described for multiplexing data recorded in a spatially and temporally demultiplexed manner on tape 12 and replayed by a plurality of replay heads A, B, C, D organized in groups, where each group includes a plurality of replay heads A/C, B/C, connected in common to a head channel 42, 44. First multiplexers 84, 92 multiplex the data in respective head channel, the output of the first multiplexers being stored in respective video buffers 86, 94. A second multiplexer 88 then selectively addresses the video buffers in response control signals to produce a multiplexed output which can reliably be reproduced even under extreme error conditions and in all playback modes.

22 Claims, 10 Drawing Sheets

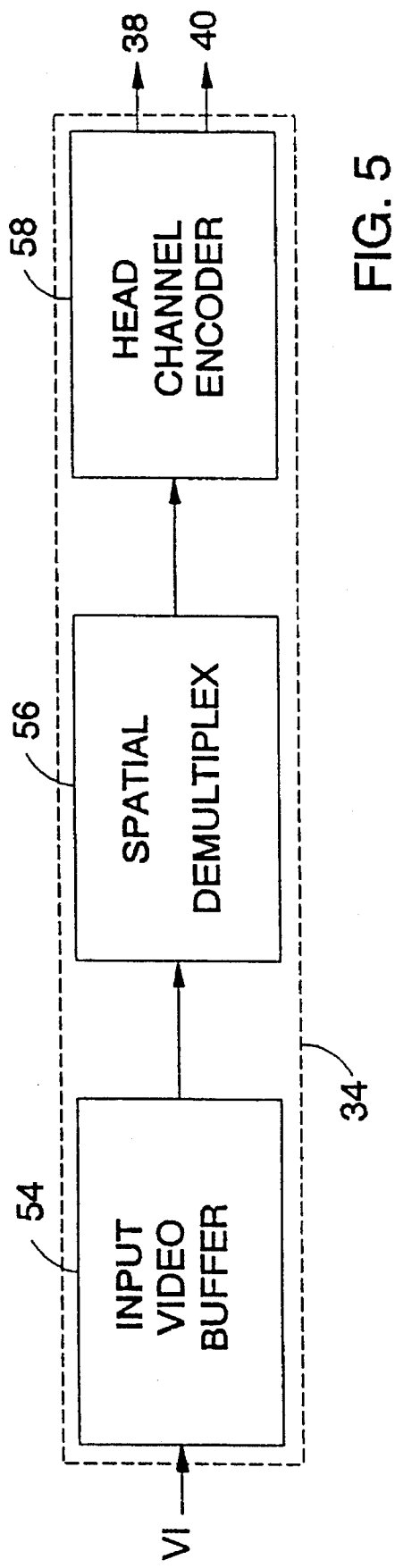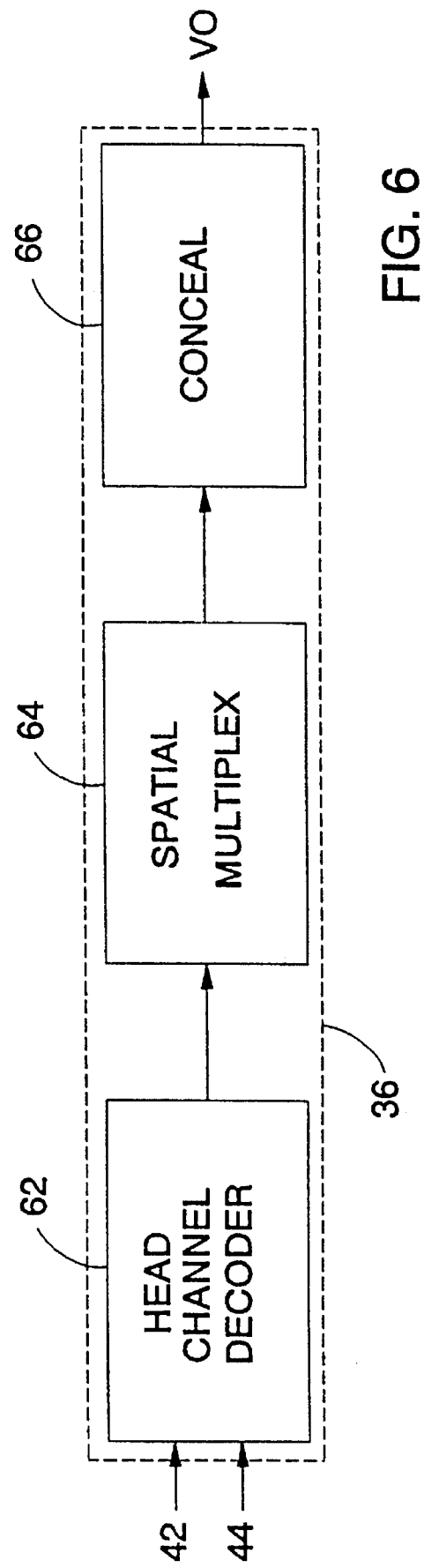

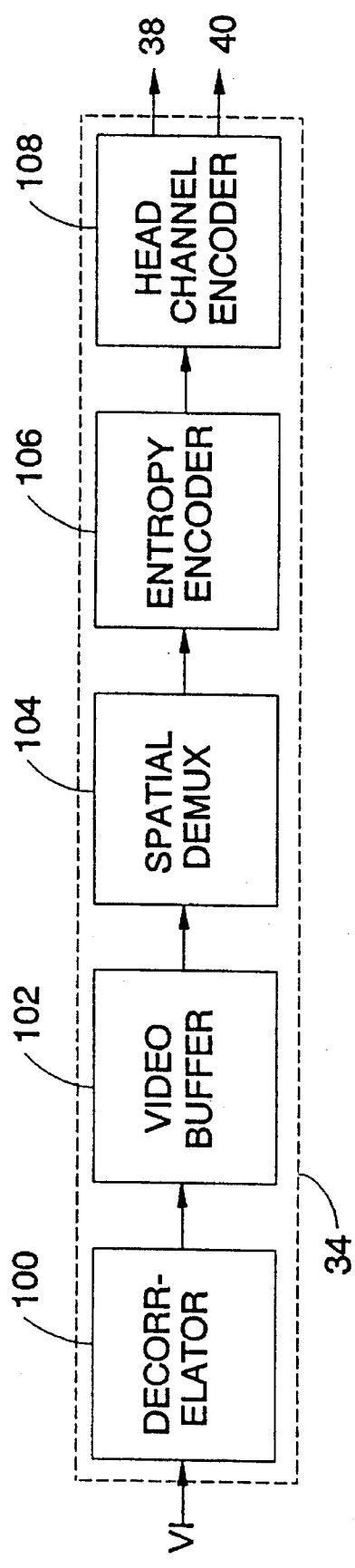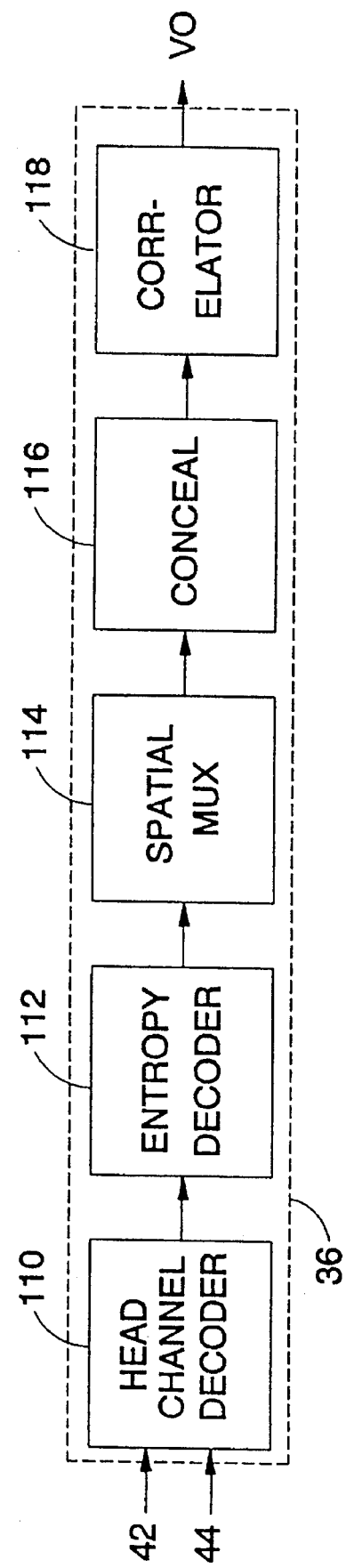

APPARATUS FOR PROCESSING REPRODUCED DATA INCLUDING TWO MULTIPLEXERS THE FIRST OF WHICH IS RESPONSIVE TO REPRODUCED FIELD INFORMATION

BACKGROUND OF THE INVENTION

1. Field of the invention

The invention relates to data processing apparatus for recording and/or replaying digital data (e.g. video or image data) with a plurality of heads. The invention finds particular application in the recording of digital video data.

2. Description of the Prior Art

Given the high information densities and stringent requirements under which digital video tape recording systems operate, it is not practical to design systems in which no recording and/or playback errors are expected to occur. Typical of the sorts of problems which occur are the loss of data due to a recording of playback head becoming clogged with dirt and/or recording material from the tape, inhomogeneities in the recording layer(s) on the tape and scratches in the tape. Accordingly, known digital video tape recording systems include apparatus and methods for coping with errors which occur during the recording and/or playback of video information as part of the overall operation of such systems.

As a first level of protection against such errors, error correction codes are included with the recorded video data. If the error is a minor one then it is often possible to uniquely identify the particular piece or pieces of information that are in error and what data they should be replaced with. If the error is too severe, then such error correction cannot cope and then reliance is made upon error concealment techniques to reduce the perceivable effect of the error.

At the data rate required for recording digital video signals it is necessary to use a plurality of recording heads recording several tracks fop one video field. As a consequence of this and in order to facilitate error concealment, it is known to sub-sample the image data into a number of different data processing and recording channels. In this way, if an error occurs in one channel, then there will be data from the remaining channels surrounding the missing data points from the defective channel. For each erroneous pixel, a replacement pixel value can be interpolated from the surrounding pixel values from the other channels within the same field or frame or alternatively from the corresponding pixel position in preceding and/or following video fields or frames. Whilst detail is still lost from the image by such errors, the overall effect of such error concealment is to make the error less immediately perceivable. An example of digital video tape recorder apparatus employing such an approach to error handling is described in GB-A-2 140 189. In this known apparatus, with a recording head assembly having 2 n heads, where n is 1, 2 or 3, a demultiplexer demultiplexes video samples of an incoming digital television signal sample-by-sample into 2 n channels for supply to the 2 n recording heads and a switching arrangement for switching the connections between the channels and the heads line-by-line and possibly also field-by-field or frame-by-frame of the television signal. Although GB-A-2 140 189 mentions the idea of switching the head allocation field-by-field or frame-by-frame, i.e. a temporal demultiplexing of the video signals it does not describe a detailed implementation of this. In practice a sample-by-sample, or spatial demultiplexing of the video signals has to date been found sufficient.

GB-A-2 140 189 describes the demultiplexing of video data into four channels for supply to each of four heads A, B, C and D. A stream of video pixels for a video field is received as a stream of pixels, pixel-by-pixel from left to right within a scan line and line-by-line. The demultiplexing is applied in a cyclical manner so that successively received pixels are applied to respective ones of the heads A, B, C and D. To facilitate concealment of errors each pixel is arranged to be surrounded by eight pixels not processed by the same head, switching occurs between the heads A and C and between the heads B and D on a line-by-line basis. The result of the demultiplexing operations described in GB-A-2 140 189 is illustrated in FIG. 23. It can be seen that each line of pixels contains the sequence A, B, C, D, A, B, C, D, and so on, with, however, the sequence displaced in alternate lines by two pixel positions within that line. This simple structure always ensures that a pixel is surrounded by pixels from the other three heads. The demultiplexing strategy described in GB-A-2 140 189 has been found to be satisfactory in most cases where digital pixel samples are recorded directly on tape.

In view of the high information densities involved in image data processing, particularly as image definition increases, it is desirable that some form of data compression be performed upon the image data before it is recorded. One set of techniques for achieving such data compression involves the decorrelation of the image data from the spatial domain into a transform domain. Once decorrelated into the transform domain, the redundancy within the image data can be better exploited to yield efficient compression. The data is stored or transmitted as an encoded version of the image in the transform domain. Decorrelation is a technique for redistributing the energy of the signal into different frequency bands where they are more suited to the application of efficient coding methods.

It has been proposed to apply an analogous approach to that described in GB-A-2 140 189 with data compression by sub-sampling video data into the transform domain and interpolating any erroneous parts in the reproduced transform domain data from the immediately adjacent parts of the transform domain data. It was proposed to apply spatial demultiplexing of the video samples only, this having proved to be adequate in prior systems. It was proposed to lay down data on magnetic tape in data blocks, each of which contains a transformed, encoded and compressed version of a set of sub-sampled data from the original input image data. If errors in reproducing the data (e.g. drop outs) occur, then these are most likely to affect only individual data blocks with a resultant loss of only one sub-sampled part of the original input image data from a particular region of the image in the spatial domain. In this way, it was intended that other sub-sampled parts of the input image data could be used to provide effective error concealment.

However, it has been found that the performance of the spatial demultiplexing strategy of GB-A-2 140 189 was much less effective when applied in the transform domain than in the prior art. Also although GB-A-2 140 189 does suggest the idea of temporally demultiplexing the video data, it does not teach a systematic approach to carrying this out.

Our co-pending UK patent application GB 9214299.1, filed on the same date as this application, relates to a multi-head recording system using spatial and temporal demultiplexing of data. The co-pending patent application uses a recording head mechanism with multiple recording heads organised in groups, where each group comprises a plurality of recording heads connected in common to a head channel. It is relatively easy to ensure the data is recorded (and subsequently replayed) in a synchronised manner when this occurs within a single data channel. However, synchronisation of data stored by different head channels is a much more difficult matter. The object of this invention is to enable the efficient temporal multiplexing of data recorded in a spatially and temporally demultiplexed manner by a multi-head recording system having multiple heads organised in groups where each group comprises a plurality of heads connected in common to a head channel.

SUMMARY OF THE INVENTION

In accordance with the invention there is provided a data processing apparatus for processing data recorded in a spatially and temporally demultiplexed manner on a recording medium and replayed by means of a plurality of replay heads, the replay heads being organised in groups where each group comprises a plurality of replay heads connected in common to a head channel, the data processing apparatus comprising a plurality of first multiplexer means, each first multiplexer means being connected to a respective head channel and being responsive to first control information for multiplexing data relating to a plurality of data processing channels from the replay heads of a head channel and second multiplexer means connected to receive the output of each of the first multiplexer means, the second multiplexer means being responsive to second control information to selectively multiplex the data between the head channels to separate data into respective data processing channels.

A data processing apparatus in accordance with the invention permits the multiplexing of data from a recording medium (e.g. a tape) in accordance with a separable process of at least two levels.

In order to improve concealment, the data is preferably recorded in tracks on the recording medium with a plurality of data processing channels being recorded on respective portions of a track. Each replay head then replays data relating to a plurality of data processing channels. Preferably, therefore, each first multiplexing means additionally multiplexes data relating to a plurality of data processing channels from each head of the head channel in response to the first control information. In this case the apparatus in accordance with the invention performs the multiplexing operation as a three stage separable process.

Preferably, the second multiplexer means comprises a logic circuit responsive to signals representing the second control information and a selector circuit connected to receive the output of each of the first multiplexers and responsive to the output of the logic circuit, the logic circuit controlling the selection of data from the first multiplexer means by the selector circuit in accordance with the second control information.

Each first multiplexer means is preferably responsive to first control information which is recorded on the recording medium with the data to be multiplexed and identifies the location of the data on that medium. Where the data recorded on the recording medium is representative of fields of data, the second multiplexer means is preferably responsive to second control information including information recorded with the data to be multiplexed on the recording medium and identifying a field number within a sequence of fields to which the data relates, information identifying erroneous data and a control signal identifying an inversion of the multiplexing sequence. As each of the first and second processing means is responsive to different control information, the reduction of the multiplexing operations to a multi-level separable process is facilitated.

Preferably, each first multiplexer means extracts from the replayed data, information identifying a field, frame and frame pair from the sequence of fields of video to which the replayed data relates to form part of the second control information.

Each first multiplexer means preferably also comprises error correction means for performing error correction, where possible, on data retrieved from the recording medium, and for producing the information which identifies erroneous data where error correction was unsuccessful as part of the second control information.

The control signal identifying an inversion of the multiplexing sequence is preferably derived from a signal external to the data processing apparatus, which external signal defines an output field data rate.

In a preferred embodiment of the invention for multiplexing data relating to fields of data recorded in tracks with data for two data processing channels being recorded on respective portions of a track on the recording medium and replayed by four heads (A, B, C and D) with two heads (A/C; B/D) connected to each of two head channels, the source of the data for a data processing channel on the recording medium over an eight field sequence is defined by the following table:

| Field number | : 0 1 2 3 4 5 6 7 |
|---|---|
| 1st level | : 0 1 1 0 0 1 1 0 |
| 2nd level | : 0 0 1 1 0 0 1 1 |
| 3rd level | : 0 0 0 0 1 1 1 1 | where:
- the first level relates to the portion of a track—"0" represents the same portion of the track as for field 0 and "1" represents the other portion;
- the second level relates to the heads of a head channel—"0" represents the same head as for field 0 and "1" represents the other head of a head channel;
- the third level relates to the head channels—"0" represents the same head channel as field 0 and "1" the other head channel; and
- the first and second level multiplexing is performed by two first multiplexer means, each for a respective head channel and the third level multiplexing is performed by the second multiplexer means.

Preferably the apparatus comprises a plurality of buffer memories, each buffer memory being connected to a respective first multiplexer means for receiving the output thereof, the second multiplexer means being connected to the buffer memories for selectively accessing the content thereof.

The invention finds application to the storage of data in compressed form, although it is not limited to such applications. Where the data is stored in compressed form on the recording medium, the means for processing the data in respective data processing channels preferably includes means for decompressing the compressed data and for concealing errors and the means for recombining the processed data to form the output data includes interpolation means.

The invention finds particular but not exclusive application to the recording of video data.

The invention also provides a digital video tape replay apparatus comprising a tape transport including a plurality of heads on a rotating head mechanism for recording and/or replaying a tape with slanting tracks which extend diagonally across the tape and data processing apparatus as defined above.

BRIEF DESCRIPTION OF THE DRAWINGS

FIG. 5 is a schematic block diagram of a first example of a record signal processing apparatus for FIG. 1;

FIG. 6 is a schematic block diagram of a first example of a replay signal processing apparatus for FIG. 1;

FIG. 13 is a schematic block diagram of a second example of a record signal processing apparatus; and FIG. 14 is a schematic block diagram illustrating a second example of a replay signal processing apparatus.

DESCRIPTION OF THE PREFERRED EMBODIMENTS

Figure 1:
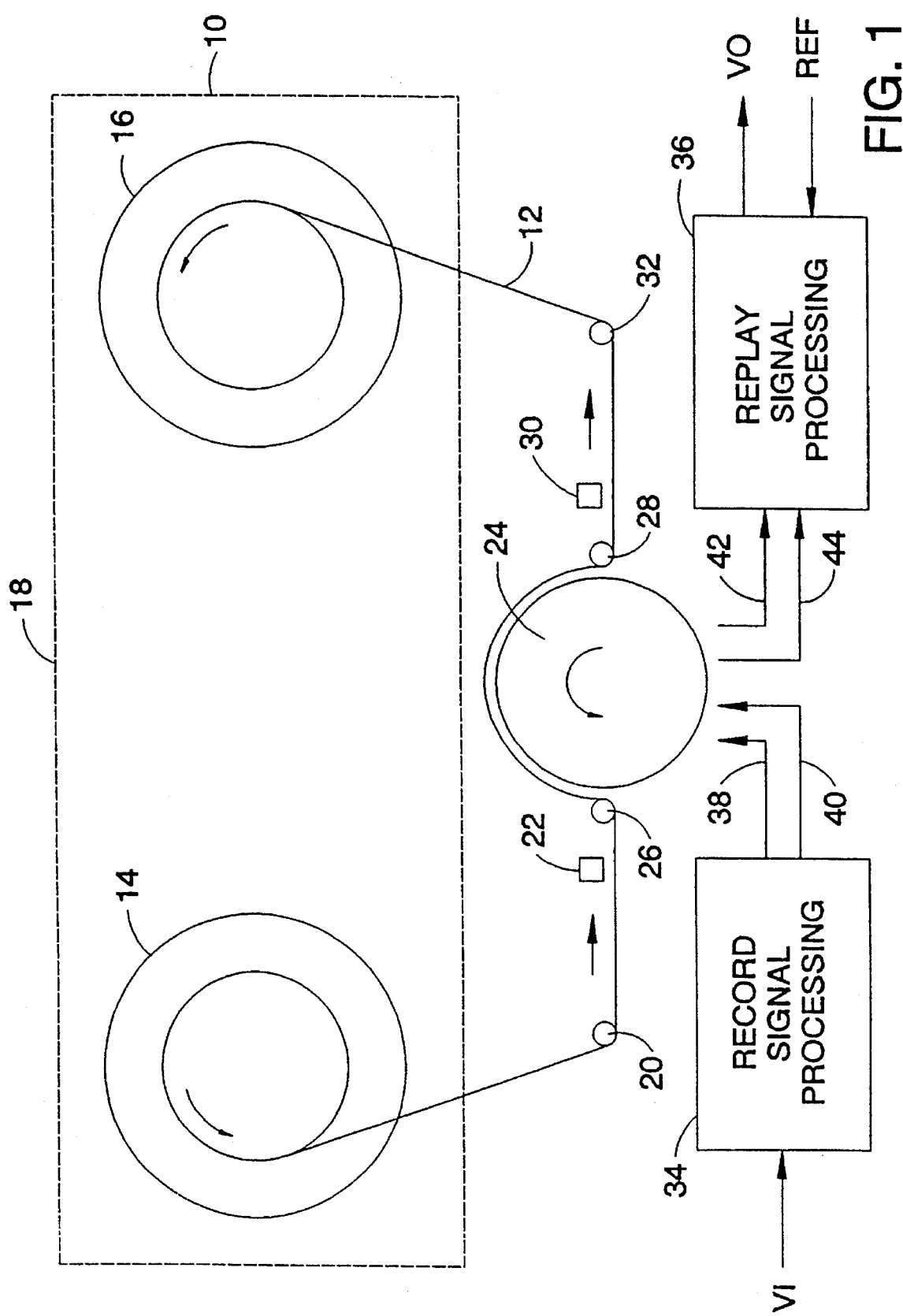
FIG. 1 is a schematic diagram giving an overview of a video tape system in accordance with the invention.

FIG. 1 is a schematic block diagram of a tape transport mechanism. FIG. 1 shows a helically scanned magnetic tape mechanism 10 in which magnetic tape 12 to be recorded or replayed is driven from a supply spool 14 to a take up spool 16 by a suitable drive motor (not shown). The supply spool 14 and the take up spool 16 may be housed within a tape cassette 18. The magnetic tape 12 from the supply spool 14 is guided by a guide roller 20 past a longitudinal record/replay head 22. The magnetic tape 12 then wraps around a rotary head drum 24, being guided by an entry guide roller 26 and an exit guide roller 28. When the magnetic tape 12 leaves the exit guide roller 28, it passes a second longitudinal record/replay head 30 and is then guided by a guide roller 32 onto the take up spool 16.

Record signal processing apparatus 34 receives digital video input signals, VI, for example from a camera after being processed through an analogue-to-digital converter. The input digital video signals typically comprise multi-bit (for example 8 bit) samples or words, each representing a respective pixel of a scanned image or picture. The record signal processing apparatus 34 processes the signals before being passed to the heads of the tape transport mechanism via head channels 38 and 40 storage on the tape 12. The processed video signals read from the tape 12 are supplied via head channels 42 and 44 to a replay processing apparatus 36 for generating output digital image signals V0. The replay signal processing apparatus 36 receives reference signals, REF, defining, among other things, output video rate timing signals.

The arrangement by which the magnetic tape is wrapped around the rotary head drum 24 will be described in more detail with reference to FIG. 2. The rotary head drum 24 carries four magnetic record/replay heads A, B, C and D, arranged in pairs with each pair being disposed at 180° with respect to the other. Heads A and B form one pair of record/replay heads and heads C and D form the second pair of record/replay heads. When a recording is being made on the magnetic tape 12, the record/replay heads on the rotary head drum 24 are supplied with suitable electrical record signals by the record processing apparatus 34 (see FIG. 1). The record processing apparatus supplies the record signals on two separate record head channels 38 and 40 (see FIG. 1): the first record head channel 38 is connected in common to heads A and C, whereby heads A and C form a first group of heads, and the second record head channel 40 is connected in common to heads B and D, whereby heads B and D form a second group of heads. Similarly first and second replay head channels 42 and 44 are connected to the first group of heads (A and C) and the second group of heads (B and D), respectively.

Figure 2:
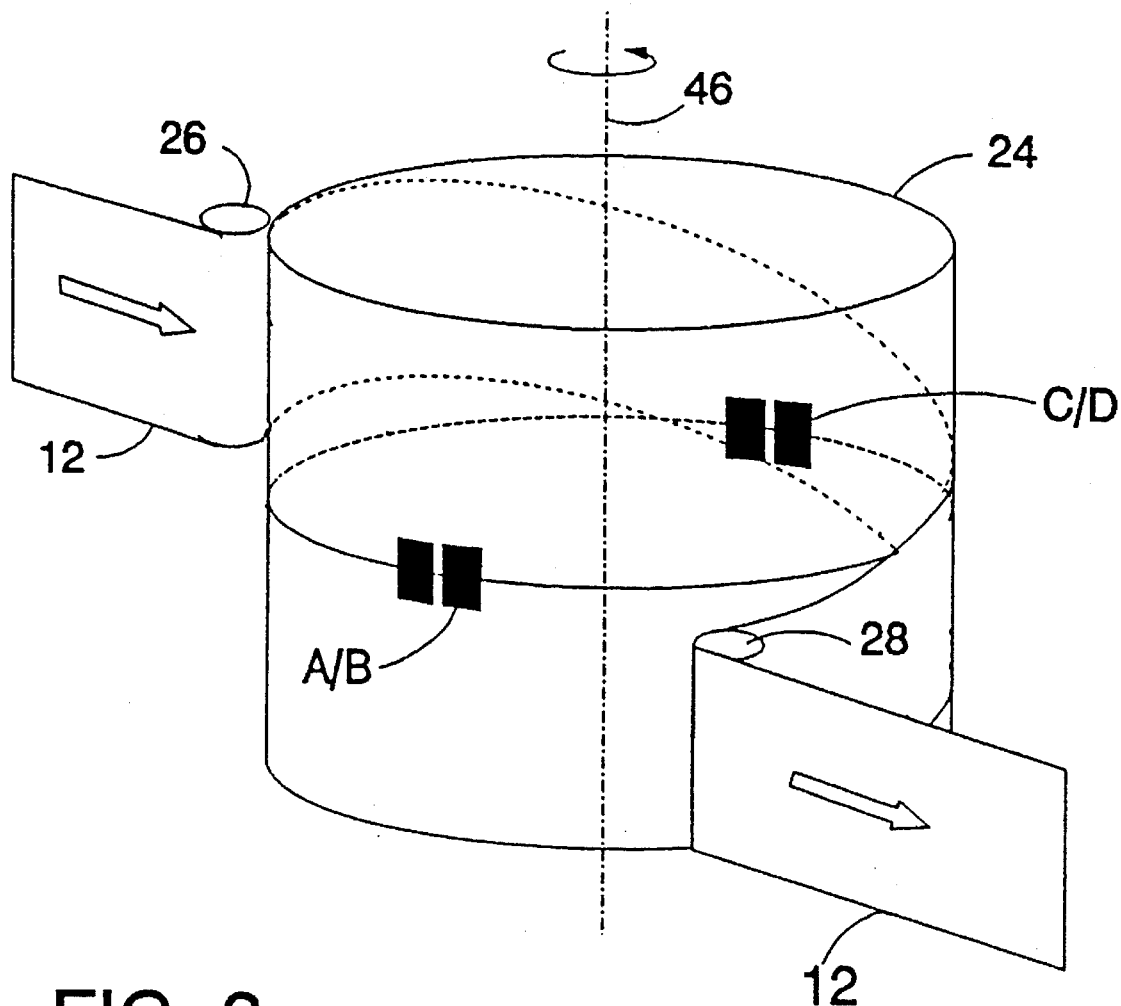
FIG. 2 is a schematic diagram illustrating a rotating head mechanism the system of FIG. 1.

FIG. 2 is a schematic diagram of a rotary head drum 24 for use in a tape recorder as shown in FIG. 1. In use, the rotary head drum 24 rotates about an axis of rotation 46 at the video field frequency. For example, therefore, for a 50 Hz video field frequency, the rotary head drum rotates about the axis of rotation at 50 revolutions per second. The magnetic tape 12 is wrapped around the rotary head drum through an angle of about 180°. The magnetic tape is guided onto the rotary head drum by an entry guide roller 26 and is guided off the rotary head drum by an exit guide roller 28. The entry guide roller 26 is higher, in a direction parallel to the axis of rotation 46, than the exit guide roller 28. In this way, the magnetic tape 12 is guided in a gently descending spiral path around the periphery of the rotary head drum 24. The longitudinal speed of the magnetic tape 12 is such that during a single rotation of the rotary head drum 24, the tape advances by a distance which is very much smaller than the circumference of the rotary head drum 24. This arrangement means that data can be supplied alternately for head A and head C via a common head channel in respective time slots. The same applies for heads B and D.

Figure 3:
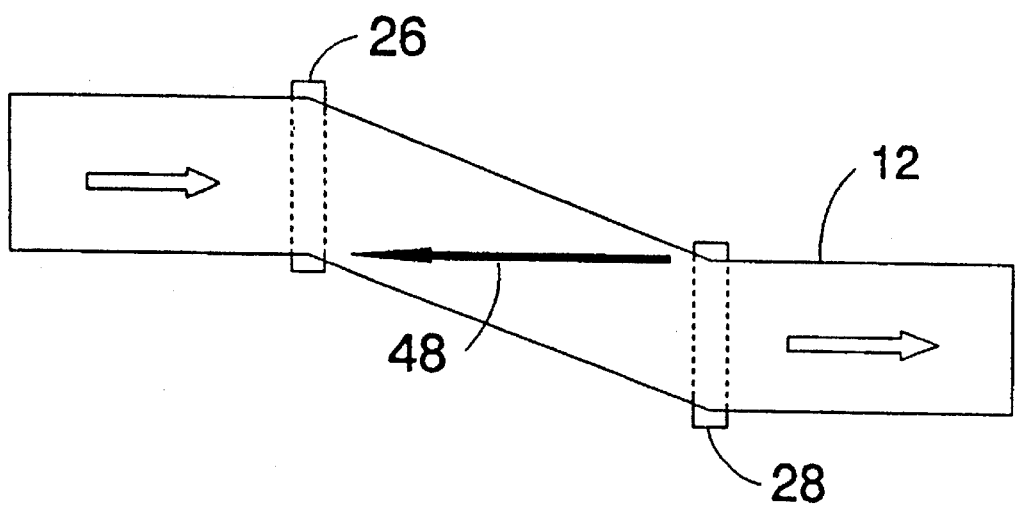
FIG. 3 is a schematic diagram illustrating the recording of a track on a tape with the system of FIG. 1.
Figure 4:
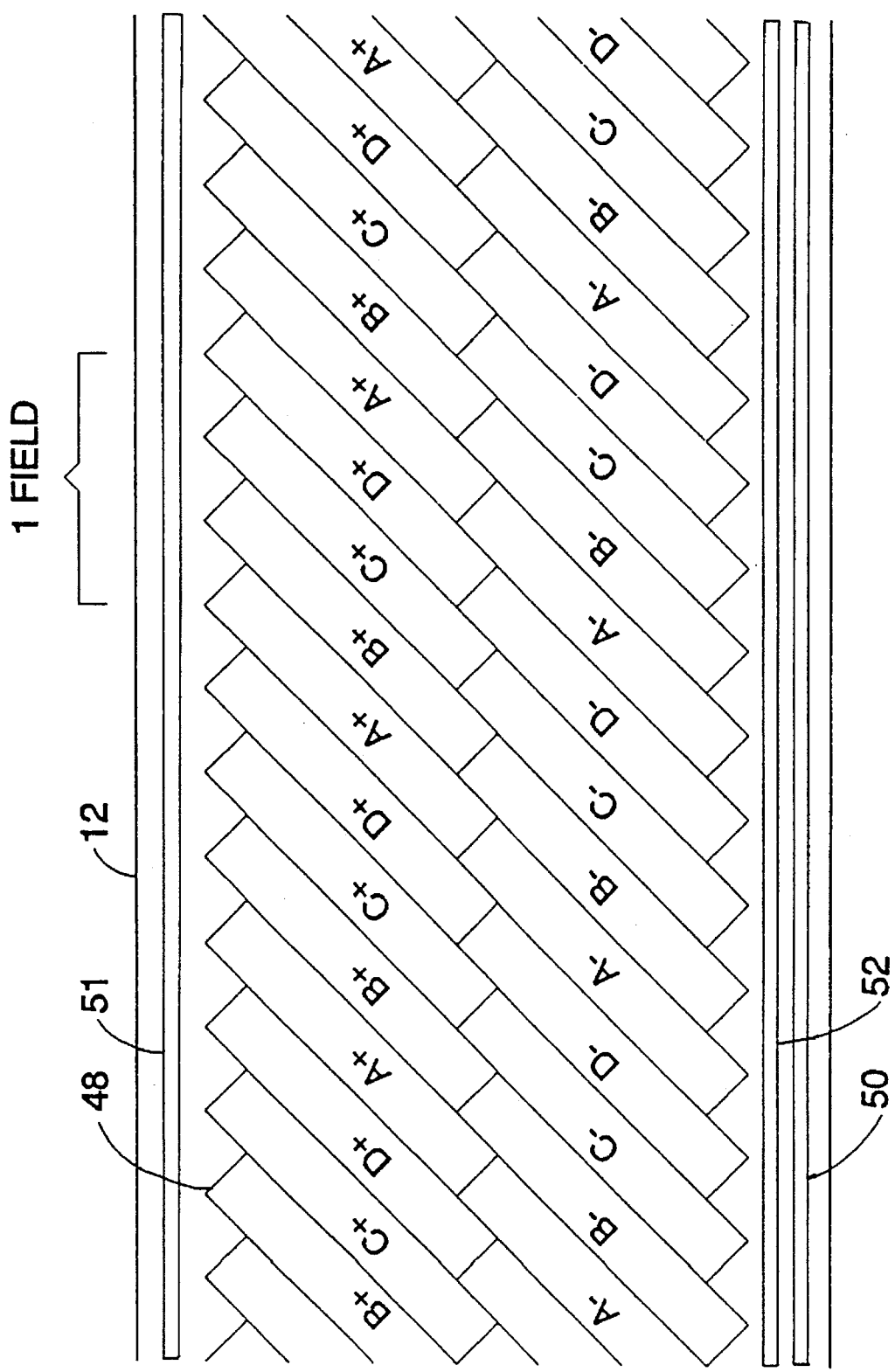
FIG. 4 is a schematic diagram illustrating data recorded on a tape with the system of FIG. 1.

FIG. 3 illustrates the path on the magnetic tape followed by one head on the rotary head drum 24. The entry guide roller 26 is in a higher plane than the magnetic record/replay heads A, B, C, D which are in turn higher than the exit guide roller 28. The result of this is that each head traces out a slanting oblique path (often termed a helical path) 48 on the tape. In FIG. 3 the angle of the path is exaggerated for clarity; in practice the oblique path 48 would be much longer than the width of the magnetic tape and would lie at an angle of about 4.5° to the edge of the tape. Because the tape is moving at a slow longitudinal tape speed the rotating magnetic record/replay heads A, B, C, D on the rotary head drum 24 form a succession of oblique record tracks 48 which are spaced longitudinally along the tape. FIG. 4 is a schematic representation of tracks recorded on the tape in an embodiment of the present invention showing the oblique tracks 48 on the tape. Successive tracks ape recorded by the heads A, B, C and D respectively. Four tracks correspond to one field of input video. It can be seen that each of the tracks A, B, C, D, is labelled, perspectively, A–, B–, C–, D– and in the upper area of the track A+, B+, C+, D+. As will be explained later, the data stored on the tape is derived from eight data processing channels.

In addition to the oblique tracks 48, a linear track 50 for time code information, a linear track 51 for analogue audio (audio cue) information and a further linear track 52 for further audio information are provided by means of the linear record heads.

As explained above, the initial motivation for the present invention resulted from the need to provide for the efficient concealment of errors which can occur during the recording and replay of data (e.g. video data) in compressed form. However, the exact format of the recorded data is immaterial to the present invention. Indeed, the invention is equally applicable to a recording system where data is recorded in uncompressed form. Accordingly, for ease of explanation, the first embodiment described herein is one where data is recorded in uncompressed form. This first embodiment is described with reference to FIGS. 5 to 12. FIGS. 13 and 14 explain how the invention can be incorporated in a system which records data in compressed form.

Accordingly, FIG. 5 is a schematic block diagram showing an example of the record signal processing apparatus 34 of FIG. 1 for recording data in non-compressed form. The input digital video signals I are stored in an input video buffer 54. A spatial demultiplexer 56 controls the output from the input video buffer 54 and supplies this to head channel encoder 58, which applies error correction codes to the spatially demultiplexed video signal from the spatial demultiplexer 56 and additionally demultiplexes the data in a temporal manner. The output of the head channel encoder 58 is passed to the tape transport 14 via the head channels 38 and 40 for storage on tape.

FIG. 6 is a schematic block diagram of a first example of the replay processing apparatus 36 of FIG. 1 for replaying data recorded by the apparatus of FIG. 5. During replay, recorded signals on the tape are supplied from the tape transport 14 to a head channel decoder 62 on two head channels 42 and 44. The head channel decoder performs initial channel decoding, error correction and temporal multiplexing functions on the video data replayed from the tape. The output of the head channel decoder 62 is supplied to a spatial multiplexer 64 which performs spatial multiplexing of the recovered data and passes this to the concealment unit 66 for covering up, or concealing, tape reading errors.

Figure 7:
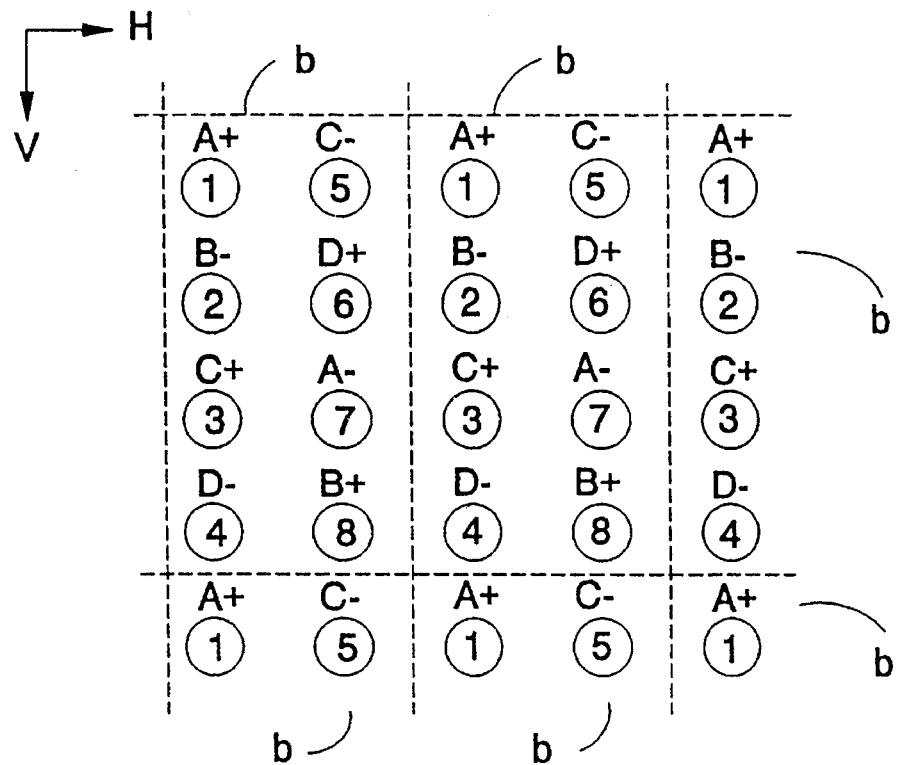
FIG. 7 illustrates the spatial demultiplexing of the input video by a spatial demultiplexer of the record signal processing apparatus.

FIG. 7 illustrates how the spatial demultiplexer 56 separates or demultiplexes the data into eight data processing channels. The spatial demultiplexer 56 effectively forms addressing logic which scans each video field in the input video buffer 54 (by means of address lines—not shown) a total of eight times for each video field stored therein. On each scan of the stored data different pixel samples are read so that after the eighth scan all the pixel samples of each video field have been read. In the preferred embodiment every second pixel on every fourth line is selected for each channel as indicated in FIG. 7, which represents the top left corner of a video field. Thus the horizontal axis represents the horizontal direction within the decorrelated image and the vertical axis represents the vertical direction within the decorrelated image. The eight data processing channels are referenced 1–8 and are assigned labels A+, A–, B+, B–, C+, C–, D+, D– for reasons which will be explained later. Thus for data processing channel 1 the 1st, 3rd, 5th . . . . , pixel samples on the 1st, 5th, 9th, . . . , lines are selected, for data processing channel 2 the 1st, 3rd, 5th, . . . , pixels on the 2 nd, 6th, 10th, . . . , lines are selected, and so on as indicated in FIG. 7. In other words the pixels are assigned in accordance with a pattern which repeats for the 2×4 pixel blocks labelled 'b' in that Figure.

In the present embodiment, each of the eight data processing channels is processed sequentially by common hardware, although it will be appreciated that it could be processed by separate hardware channels in parallel. Thus the data for the eight respective data processing channels for each field of video are supplied in respective time slots to the head channel encoder 58 for further processing.

Figure 8:
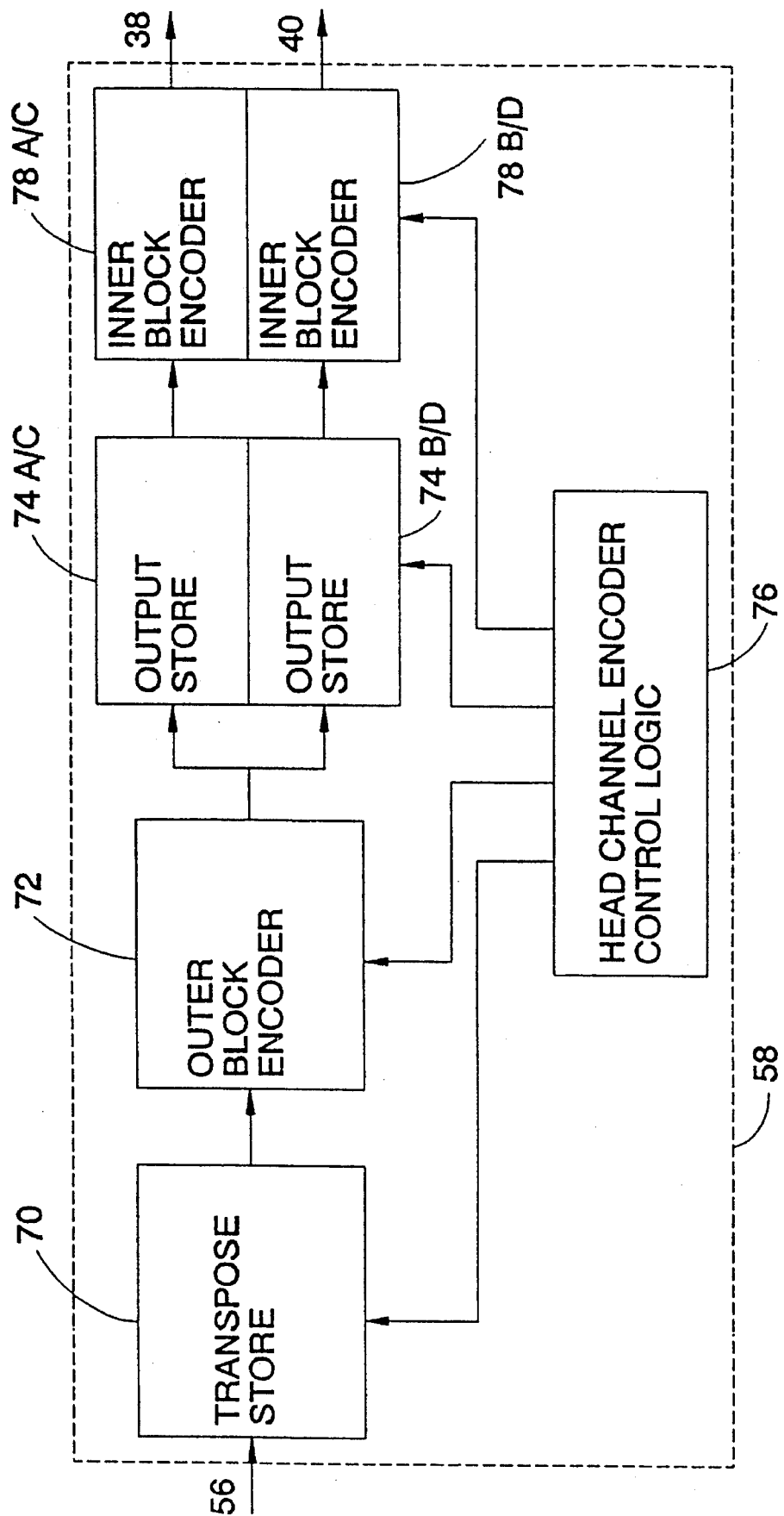
FIG. 8 is a schematic block diagram of a head channel encoder of the record signal processing apparatus.

FIG. 8 is a schematic block diagram of the head channel encoder 58. This comprises a transpose store 70, an outer block error correction encoder 72, first and second output stores 74 A/C and 74 B/D, head channel encoder control logic 76 and first and second inner block error correction encoders 78 A/C and 78 B/D. The inner block error encoder adds inner block correction data to each of the inner blocks from the field store 68 of the entropy encoder. It also adds a 2 byte synchronisation word and two bytes of block identification information. However, before it does this, the outer block encoder generates a further number of inner blocks which can be used to correct certain other inner blocks which could not be corrected by the inner block correction itself.

Figure 9A:
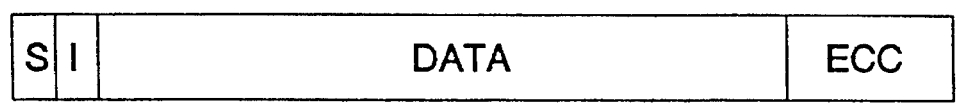
FIGS. 9A and 9B illustrates a block structure for storing data on tape.
Figure 9B:
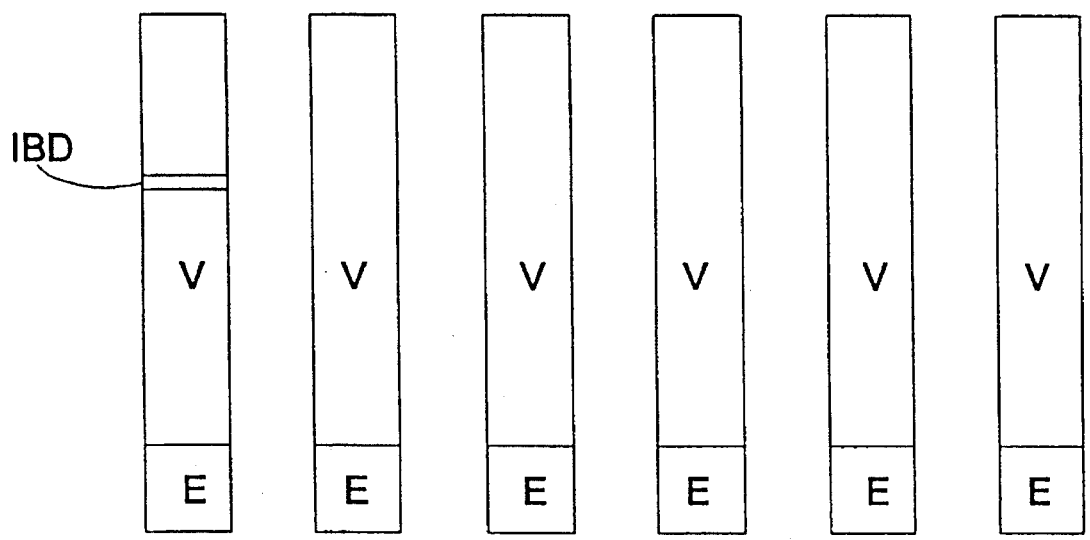

FIGS. 9A and 9B illustrate a block structure for the storage of digital data on tape. FIG. 9A is a schematic diagram showing the structure of one of the inner blocks mentioned above. Each inner block comprises the 2 bytes of synchronisation information ("S"), 2 bytes of inner block identification (ID) information ("I"), 120 bytes of data ("DATA"), and 8 bytes of an error correcting code ("ECC"). FIG. 9B illustrates six so-called product blocks. Each of the product blocks is 124 bytes wide (i.e. the same size as the data field of an inner block). One inner block data field is represented with the reference IBD in the left hand product block shown in FIG. 9B. The video data from 38 inner data blocks is stored in the area labelled "V" in each of the product blocks. A product block is completed through the provision of four 124 byte wide error correction codes in the area labelled "E" Each product block contains 124 byte-wide columns. One byte-wide column is termed an outer block.

Returning to FIG. 8, the operation of the head channel encoder 26 will now be described in more detail with reference to the block structure shown in FIGS. 9A and 9B. The video data inner blocks for one time slot (i.e. one data processing channel) from the field store 68 of the entropy encoder 24 are read into the transpose store 70 row by row from top to bottom (as shown in the product blocks in FIG. 12B) and within each row from left to right. The video data inner blocks comprise the video data and compression coding header information. Corresponding audio data inner blocks are also read into the transpose store row by row and within each row from left to right. This data is then read out of the transpose store 70 column by column from left to right and within each column from top to bottom. Reading the data in this transposed manner permits the outer block encoder to compute the error correction codes "E" shown in FIG. 9B for the columns (i.e. the outer blocks) of the video and audio data, "V" shown in FIG. 9B.

The output of the outer block error correction encoder during one time slot (i.e. for a data processing channel) is then stored in one of output stores 74 A/B or 74 B/D under the control of the head channel encoder control logic 76. One output store 74 A/B is used to contain the data for the first head channel 15 and the second output store 74 B/D is used to contain the data for the other of the head channels 16. The data is written into the output stores column by column from left to right (as represented in FIG. 12B) and within each column from top to bottom. The output stores are read so as to perform a further transpose function by reading the data row by row from top to bottom and within each row from left to right. Thus, when the data is read from the output stores 74 it is in the inner block format. The synchronisation "S", inner block ID "I" and the inner block error correction "ECC" information are added by the appropriate inner block encoder 78 A/B or 78 C/D. The completed inner blocks are supplied via the head channels 15 and 16 to the tape transport to be recorded on tape.

The error correction encoding processes performed by the inner and outer block encoders will not be described in further detail herein as the choice of a particular error encoding process is not required by the present invention. A conventional error correction encoding process such as one using Reed-Solomon codes can be used.

The inner block ID "I" identifies the inner block number, the video field, frame and frame pair number from an eight field sequence to which the inner data block relates and a head track and sub-track onto which the data is to be recorded as defined by the temporal demultiplexing sequence.

Figure 10:
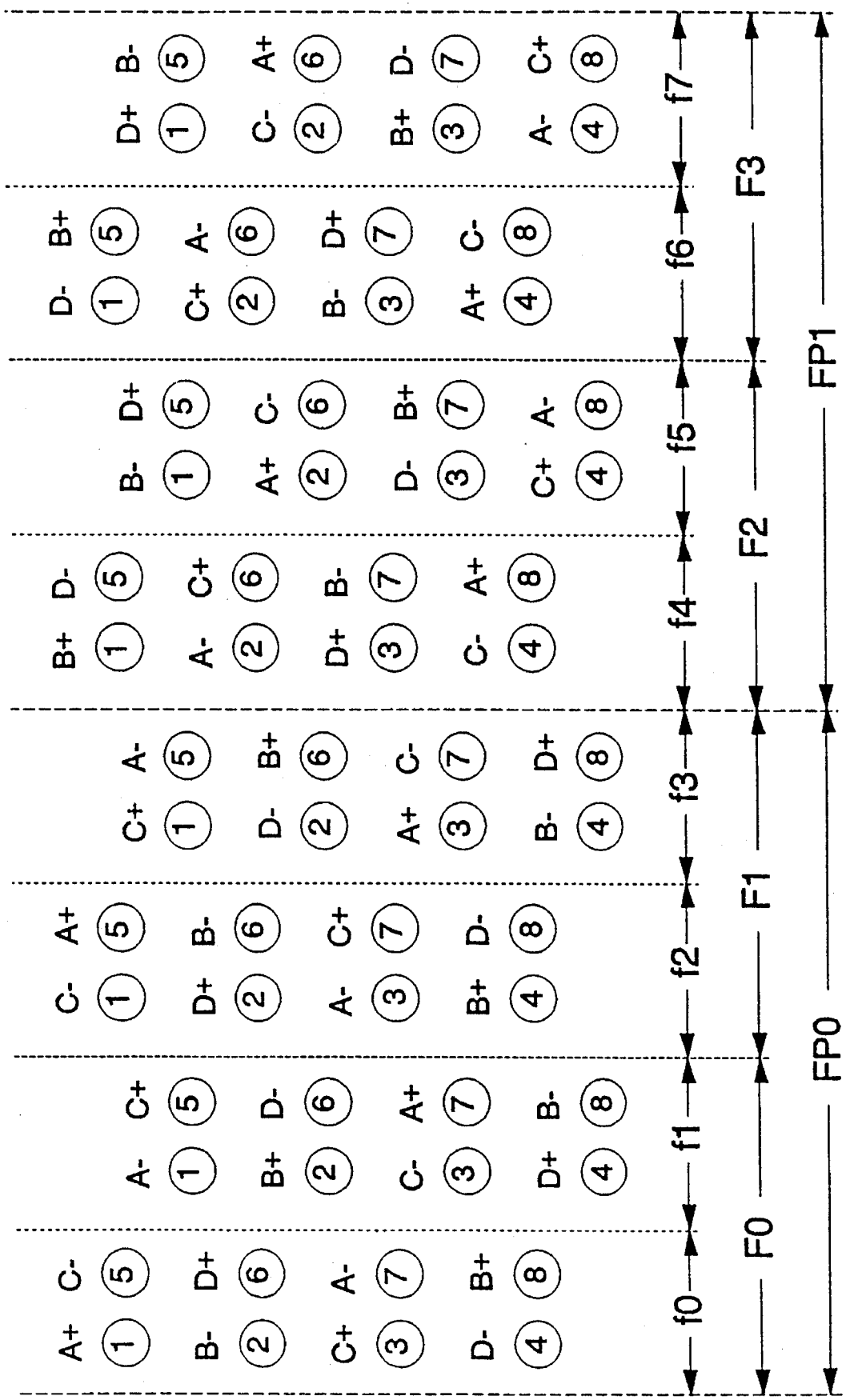
FIG. 10 illustrates a temporal demultiplexing performed by the head channel encoder.

FIG. 10 illustrates the eight field head demultiplexing sequence output by the temporal demultiplexer 80. The vertical dashed lines separate the data for respective fields. The eight circles between pairs of dashed lines represent the eight spatially demultiplexed data processing channels (1-8). The letters A to D above the circles represent the allocation of the channels to the heads for respective fields. The "+" and "−" signs represent the upper and lower track portions (or sub-tracks) respectively (compare FIG. 4). At the bottom of FIG. 10, the field, frame and frame pair number are indicated. There are eight fields (F0–F7), four frames (F0–F4) and two frame pairs (FP0, FP1) in the eight field cycle. The sequence shown in FIG. 10 repeats every eight fields.

It will also be noted that the pattern of head channels in field zero of FIG. 10 corresponds to the top left hand block of eight pixels in FIG. 7. FIG. 7 illustrates the relationship between the spatial positions of the pixels within the decorrelated image and the eight data processing channels whereas FIG. 10 represents the allocation of the channels to the heads for successive fields. The relationship of the data processing channels to the head sub-tracks (A+, A−, B+, B−, C+, C−, D+, D−) illustrated in FIG. 7 only applies to one of eight fields of input video (i.e. field 0). The temporal demultiplexer 80 changes the mapping of the data processing channels to the heads and head tracks each field of video so as to temporally interleave the data processing channels among the heads. Thus, in an eight field sequence, each pixel will be allocated to each of the head sub-tracks in turn. The result of this is that the data for adjacent pixels can be distributed over the tape in a manner which enables efficient recovery from many of the types of errors which can occur in the recording of data on a video tape. Such errors include the failure of a particular head, for example due to a build up of dirt and/or material from the tape, scratches in the tape and so on, as will be described later.

Figure 11:
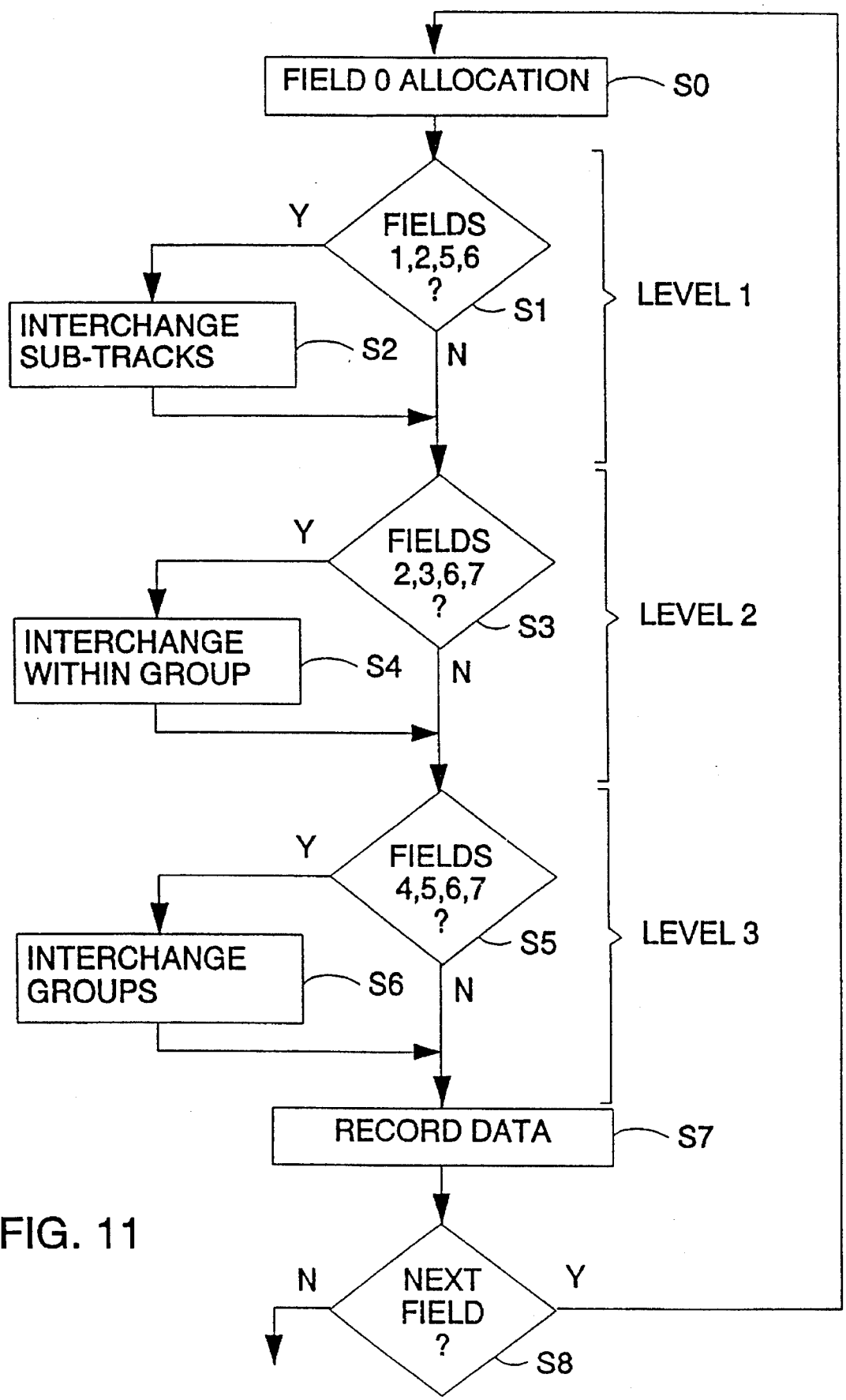
FIG. 11 is a flow diagram illustrating the operation of the temporal demultiplexer.

FIG. 11 is a flow diagram representing the logic behind the operation of the head channel encoder controller 76 for generating the temporal head demultiplexing sequence, which has been arranged such that it can be reduced to a three level separable process with respect to time. The separation into three levels makes the process of demultiplexing and multiplexing easier to implement. The aim of the demultiplexing is to distribute data in a temporal manner between the heads such that more efficient concealment is possible on replay of the information from the tape. FIG. 11 explains how to arrive at the allocation of the data processing channels fop each of the fields 1–7 in the eight field sequence with respect to the allocation fop field 0

For field f0 of FIG. 10 the eight separate data processing channels (0–7) are allocated to the upper (+) and lower (−) portions of the tape fop the heads A, B, C and D as indicated in FIG. 9. This is represented by step S0 of FIG. 11.

For the first level of demultiplexing, if a current field in an eight field sequence is field f1, f2, f5 of f6 (step S2), then in step S3 the allocation of the data channels to the upper and lower track portions is interchanged. In other words, if in field f0 a channel is allocated to an upper portion of a track, then fop fields 1, 2, 5 of 6 it is allocated to a lower portion of a track (and vice versa).

For the second level of demultiplexing, if a current field in the eight field sequence is field f2, f3, f6 of f7 (step S3), then the data processing channels ape interchanged within a group of heads (step S4). In other words, if in field f0 a data processing channel is allocated to head A in fields f2, f3, f6 or f7, the data processing channel will be reallocated within a group to head C. Likewise head C will be switched to group A, head C to head D and head D to head B.

For the third stage of demultiplexing, if a current field in the eight-field sequence is field f4, f5, f6 of f7 (step S5), then processing channel is switched between groups of heads in step S6. In other words, if in field f0 a data processing channel is allocated to heads A of C, it will be reallocated fop fields f4, f5, f6 and f7 to heads B of D. Likewise an allocation to heads B of D is switched to heads A of C.

The data from the data processing channels is then recorded in step S7 in accordance with the allocation defined by steps S1 to S6 above. If another field is to be processed, step S8, then the process of allocation from the initial allocation is repeated.

In practice, this distribution of the data processing channels to the heads is achieved by selective addressing of the output stores 74 A/C and 74 B/D of the FIG. 8. The separation of the data for the head channels 38 and 40 (i.e. the third level demultiplexing for heads A/C and B/D respectively) is performed by writing the data to be recorded into the appropriate one of the output stores 74 A/C and 74 B/D. The separation of the data to the heads within a channel and the upper and lower portions of the head tracks (i.e. the first and second level demultiplexing into A+, A−; C+,C− for head channel 38 and B+, B−; D+, D− for head channel 40) is performed by selective reading from the output stores 74 A/C, 74 B/D by the head channel encoder control logic 76 in accordance with the logic represented in FIG. 11.

The temporal demultiplexing sequence is chosen to enable reliable correction or concealment of errors which can occur during the tape recording and replay process. The sequence has to take account of the various replay modes of the tape recorder. For example, it is important to avoid the generation of artifacts and other effects during, for example, shuttle replay at various speeds.

The replay signal processing apparatus of FIG. 6 will now be described.

Figure 12:
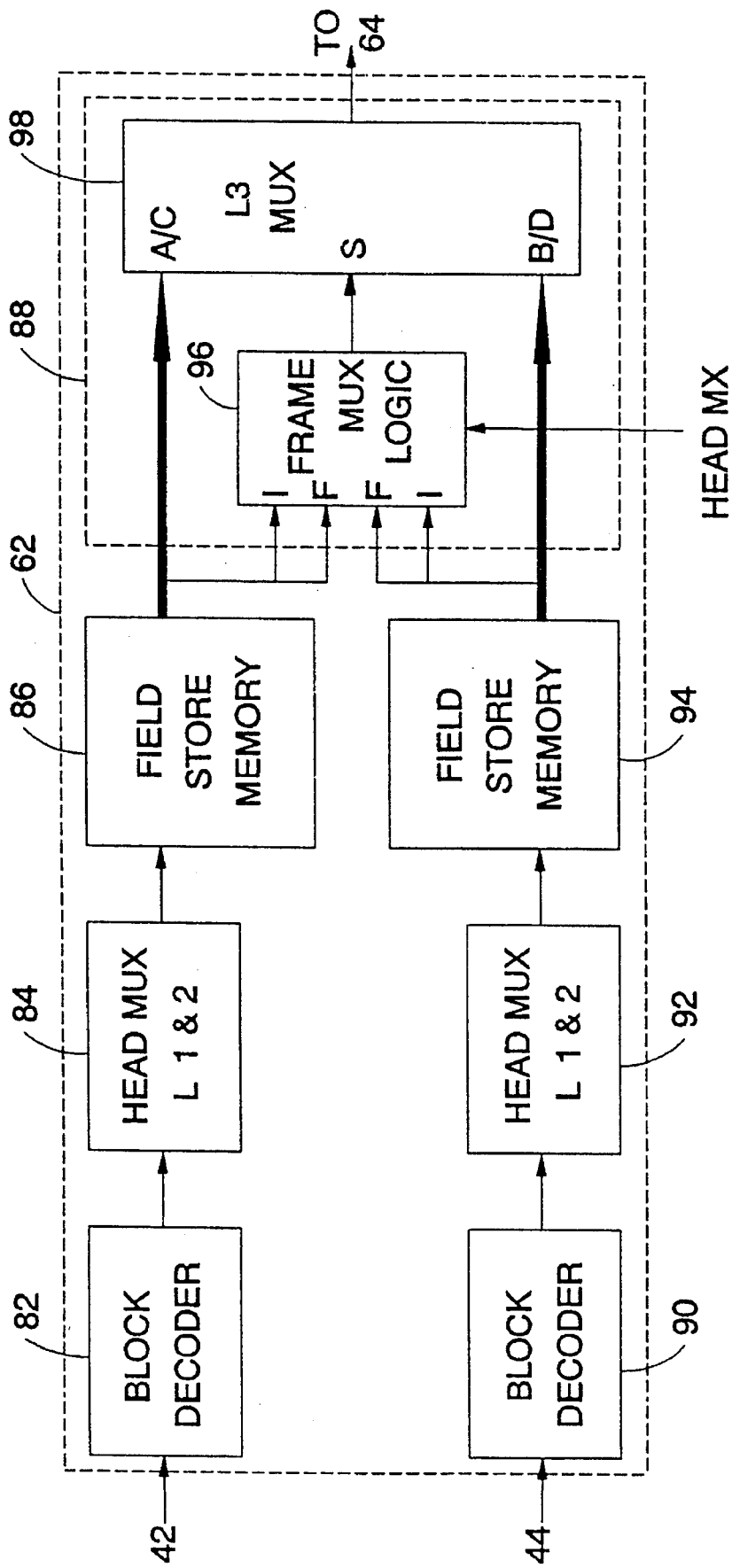
FIG. 12 is a schematic block diagram of a head channel decoder of the apparatus of FIG. 3.

FIG. 12 is a schematic block diagram of the head channel decoder 62 of FIG. 6. The head channel decoder 62 performs the head multiplexing as a three stage or three level separable process. The three stages or levels of the separable process are represented in Table 1 to be found at the end of this description. In Table 1 the first level defines the allocation to the first or second portion of the track where "0" represents the same portion as for field f0 and "1" represents the other portion; the second level defines the allocation between the heads of a group (heads A and C form a first group, B and D a second group) and "0" represents an allocation the same head as for field f0 and "1" represents an allocation to the other head of a group; the third level defines the allocation between groups of heads (i.e. between group A/C and group B/D) and "0" represents an allocation to the same group as field f0 and "1" represents an allocation to the other group.

The head channel decoder receives the signals from the first group of heads, namely heads A and C, on a first input 42 and the signals from the second group of heads, namely heads B and D, on a second input 44.

The output from the heads A and C is supplied from the first input 42 to a first block decoder 82 which separates out the synchronisation, address and error correction data from the inner and outer blocks received from the heads A and C. The block decoder initially decodes the inner blocks received from the tape. In particular, the block decoder extracts the synchronisation information "S" the head code (A, B, C or D), the upper/lower sub-track code and the field, frame and frame pair information "I" from each inner block. The block decoder also extracts the error correction codes "ECC" stored in the inner blocks and, where possible, uses the error correction codes to correct errors within the block. The actual process of error correction can be performed in a conventional manner using the error correction codes (e.g. Reed-Solomon correction codes mentioned above). Where, however, it is not possible to correct the errors for a given inner block with the error correction codes, the first decoding circuit generates an error flag for that inner block. The block decoder subsequently uses the outer block error correction words "E" mentioned with respect to FIG. 9B to perform further error correction on the basis of the outer blocks, where possible.

The output from the first block decoding circuit 82 is passed to a first head multiplexer 84 which separates the data associated with the heads A and C. The data on the head channel 42 comprises a sequence of data from the upper portion of track A (A+), then data from the lower portion of track A (A−), then data from the upper portion of track C (C+), and then data from the lower portion of track C (C−). This sequence of data repeats once per field. The data arrives in this sequence because the heads A and C are displaced at 180° with respect to one another on the rotating head drum 24, the scanning is from top to bottom, and the drum 24 rotates once per field. Thus the data provided at the first input alternates between periods when data comes from head A and periods when data comes from head C, these periods being separated by periods when no signal is generated. The data for data processing portions A+, A−, C+, C− can therefore readily be separated for storage in the field memory 86 using the synchronisation data read from the blocks on the tape.

In particular, the first head multiplexer 84 uses the inner block ID information "I", including the information about which head and track portion the block came from (A+, A−, B+, B− etc.) and information identifying the field, frame and frame pair from the eight field sequence to which the inner block relates to determine a location in a field store memory 86 at which the data from the first head channel 42 is stored. The selective storage of the inner blocks in the field store memory 86 in response to the inner block ID information implements the first and second levels of multiplexing as represented in Table 1 (i.e. for the first head channel 42, multiplexing from the upper and lower track portions and the A and C heads).

The data from the second head replay channel 44 is processed in a similar manner by the block decoder 90 and the head multiplexer 92 for storage in the field store memory 94. The error correction codes "ECC" are used, where possible to correct errors in the inner blocks. The inner block ID information "I" is used to determine the location in the replay store 94 at which the data from the second head channel 44 is stored. The selective storage of the inner blocks in the field store memory 94 in response to the inner block ID information effectively performs the first and second stages or levels, of multiplexing as represented in Table 1 (i.e. for the second head channel 44, multiplexing from the upper and lower track portions and the B and D heads).

Thus, the first and second levels of the multiplexing operation performed by each of the first head multiplexers are those illustrated in the first two rows of Table 1 to be found at the end of this description i.e. to the data relating to the upper and lower portions of the A and C heads within a group (or the upper and lower portions of the B and D heads within the other group).

A third head multiplexer 88 then performs the third level of the multiplexing operation by separately selecting data from the first and second field memories 86 and 94 to multiplex the data from the first and second head multiplexers, whereby the data blocks for each of the eight data processing channels can be separated with data blocks for which no error correction was possible being labelled by error flags.

The last level or stage of the multiplexing operation which is illustrated in the third row of Table 1, is not as straightforward as the first and second stages. Whereas the data read from one head of a group is essentially sequential, data is provided in parallel from the two groups of heads. Also, due to mechanical instabilities of the rotating head mechanism, it is not practical to synchronise the reception of the data from these two groups. In order to take account of these factors, and in order to provide a synchronised video output, the third stage of multiplexing is performed with selective reading of data in the two field buffer memories synchronised with the output video rate. In order to correctly multiplex the data it is necessary to change the multiplex operation dependant on the frame pair number associated with the data being output. It will be remembered, with reference to FIG. 11, that the encoding or temporal demultiplexing between head channels, changes every other frame pair (i .e. for fields 0 and 4). In order to effect the third stage multiplexing, the third stage multiplexer comprises logic which is responsive to the data error flag, the frame pair identity, and also to a head multiplexing phase signal (referenced Head MX in FIG. 12) which forms part of the reference timing signals (REF) supplied to the replay signal processing apparatus for defining an output video rate. For each pair of heads (A/B and C/D) both error flags and frame pair IDs are input from the data blocks in the field memories to a logic circuit 96 (preferably a programmable array logic circuit PAL). Also input to the logic circuit 96 is the head MX signal which indicates which of the head pair A and B is due to be read. Likewise the signal indicates which of the head pair C or D is to be read. In Table 2, "0" indicates that data should be read from the natural one of the field stores 86 or 94 and "1" indicates that data should be read from the other one of the field stores 86 or 94. This is illustrated in Table 2 at the end of this description.

Table 2 assumes that the frame pair ID is constant throughout any field; this will normally be true for error free play. However, this is not the case in a shuttle mode of operation of a video tape recorder because data from all four frames in an eight field sequence can become mixed together. This can also happen in play mode if the error correction fails and concealment is required, since the previously stored data may not be from the same frame of the four frame (or eight field) sequence. Accordingly, in the preferred embodiment of the invention, the head multiplexing process is performed on a sample-by-sample basis. Note that although data from any one inner block is always from the same frame, the read process addresses data from different inner blocks on a sample-by-sample process in order to perform the outer error check process. The frame data may, therefore, change on a sample-by-sample basis and is dynamically selected on this basis by the head MX signal of Table 2.

Accordingly, the logic circuit 96 selects data either from the first field store, or buffer memory 86 or from the second field store, or buffer memory 94 according to the five inputs (i.e. the error flag and the frame ID from the first and second field buffers respectively and additionally the head MX signal). Tables 3a and 3b to be found at the end of this description illustrate how the logic circuit 96 responds to these five inputs (namely the head multiplex signal Head Mx, the frame pair number for the A/C head channel (FP A/C), the error flag for that channel (EF A/C), the frame pair number for the B/D head channel (FP B/D) and the error flag for that channel (EF B/D)) in columns 1–5 make the selection in the column 6 in order to provide the output in column 7. "1" in an error flag column indicates an error. "0" in an error flag column indicates no error. Note that the error flags "EF" and the frame pair IDs "FP" are labelled simply "F" and "I" respectively in FIG. 12 due to lack of space. The comments in row 8 indicate how potential conflicts which arise in the tables are resolved. Where the comment "don't care" is made, either buffer memory could be selected with no effect on the principle of operation. However, in such cases, the table indicates an arbitrary default choice. Table 3a is for the head multiplexing for the A/C buffer memory and table 3b is for the B/D buffer memory. The purpose of this multiplexing operation is to provide an output from the head channel decoder 62 in which the temporally demultiplexed signal from the tape is multiplexed to provide a signal in the format of the zero field of FIG. 10 (i.e. to recreate the spatial distribution indicated in FIG. 7).

The output from the head channel decoder 62 is supplied to the spatial multiplexer replay store 64 which includes a field buffer for the storage of the data from the inner blocks (with, where appropriate, the error flags set) and address circuitry for ensuring the correct addressing of the field buffer. The address circuitry applies the inverse of the spatial demultiplex mapping applied by the spatial demultiplexer 56 in order to restore the order of the data for each field of video information as represented in FIG. 7.

When the data and error flags for a complete field have been spatially multiplexed, they are then processed by the concealment logic 66. The concealment logic 66 passes data for which an error flag has not been set. Alternatively, the concealment logic 186 either generates a substitute value from any available pixel values which are adjacent in time or space in accordance with an appropriate concealment strategy.

Where concealment is performed, this can be achieved by interpolating adjacent pixels in the same field (the preferred approach when there is movement in the video images) or pixels at corresponding positions in preceding or subsequent fields or frames. These techniques are described in GB-A-2 140 189 mentioned previously. As is the case with GB-A-2 140 189, as the video data is sub-divided into processing channels for recording on the tape so that the video data is switched between the heads, concealment of pixel data due to head loss is improved with certain conditions such as loss of one replay head. However, with the separation of the video data into twice the number of data processing channels as there are heads, with each channel being allocated to a head for half the time it takes to lay a track, and cycling the allocation of the data processing channels to each of the half tracks over an eight field sequence, it is possible effectively to conceal data if an error such as a scratch on one half of the tape means that no data is recovered from that half of the tape.

Parallel processing of luminance and chrominance signals can be provided by duplication of elements of the processing circuitry. Preferably the Cb and Cr components of the chrominance signals are separated to form left hand and right hand portions of a video image, as this aids analysis of the video data. The separation of the chrominance and luminance signals into duplicate paths was not described above for reasons of clarity of explanation. However, it will be apparent to the skilled person how to adapt the above description to provide duplicated chrominance and luminance processing, duplicate processing of chrominance and luminance being well understood to one skilled in the art.

Although, in the preferred embodiment, the video data is demultiplexed into eight channels which are then temporally demultiplexed for storage on tape, the invention is not limited to this specific application and other numbers of channels may be generated. For example, the video data may be demultiplexed into four channels which are then allocated to four heads in a temporal manner. In this case, the stage of multiplexing between upper and lower portions of a tape (i.e. for first and second period during the operative phase of each head), may be omitted during both the demultiplexing and multiplexing operations. Also, as mentioned above, although the invention finds particular application to the processing of video data, is not limited thereto.

As mentioned above, the invention equally finds application to the recording of data in compressed form. FIGS. 13 and 14 are schematic block diagrams giving an overview of record signal processing apparatus and replay signal processing apparatus, respectively, for a system employing the recording of digital video signals in compressed form.

In FIG. 13, the input digital video signal VI is supplied to a decorrelator 100 which transforms the video image from the spatial to a transform domain. The decorrelation can be performed, for example, by sub-band coding or discrete cosine transform (DCT) techniques. Techniques of this sort are described, for example, in UK patent application No. 9100592.6. The output of the decorrelated image is stored in a video buffer 102. The spatial demultiplexer 104 corresponds generally to the spatial demultiplexer 56 except that the spatial demultiplexing operation is performed on the decorrelated (i.e. transform domain) data rather than on data in the spatial domain. The output from the spatial demultiplexer 104 is supplied to an entropy encoder 106. The entropy encoding process is explained in more detail in the aforementioned UK application 9100592.6. The output of the entropy encoder 106 is then supplied to a head channel encoder 108. The head channel encoder 108 performs the error correction encoding and the temporal demultiplexing on the decorrelated and compressed data for storage on tape.

In FIG. 14, the head channel decoder 110 performs the decoding of the blocks of data from tape and the temporal multiplexing of the data from the head channels into the data processing channels. The output of the head channel decoder 110 is then passed to an entropy decoder 112. The entropy decoder 112 includes a video buffer for receiving the output of the head channel decoder and logic for decompressing the compressed data. The decompressed data from the entropy decoder 112 is then spatially multiplexed in a spatial multiplexer 114, which essentially performs the inverse operation of the spatial demultiplexer 104. The output of the spatial multiplexer 114 comprises a stream of video data in the transform domain, certain blocks of which may contain data errors identified as a result of the error correction processing in the head channel decoder 110. A concealment processor 116 is employed to conceal data relating to erroneous blocks. A suitable concealment processor is described in co-pending UK patent application 9200433.2. The output of the concealment processor 116 is supplied to the correlator or interpolator 118 for reconstituting the video data in the spatial domain for output V0.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

TABLE 1

| Field No: | 0 | 1 | 2 | 3 | 4 | 5 | 6 | 7 |
|---|---|---|---|---|---|---|---|---|
| Upper/Lower (U=0, L=1) | 0 | 1 | 1 | 0 | 0 | 1 | 1 | 0 |
| A<>C, B<>D (A/B=0, C/D=1) | 0 | 0 | 1 | 1 | 0 | 0 | 1 | 1 |
| A<>B, C<>D (A/C=0, B/D=1) | 0 | 0 | 0 | 0 | 1 | 1 | 1 | 1 |

TABLE 2

| Head Mx | FP 0 | FP 1 |
|---|---|---|
| 0 | A/C | B/D |
| 1 | B/D | A/C |

TABLE 3a

| Head Mx | FP A/C | EF A/C | FP B/D | EF B/D | Select | EF Out | Comments |
|---|---|---|---|---|---|---|---|
| 0 | 0 | 0 | 0 | 0 | 0 A/C | 0 | |
| 0 | 0 | 0 | 0 | 1 | 0 A/C | 0 | |
| 0 | 0 | 0 | 1 | 0 | 0 A/C | 0 | Don't care-default A/C |
| 0 | 0 | 0 | 1 | 1 | 0 A/C | 0 | |
| 0 | 0 | 1 | 0 | 0 | 0 A/C | 1 | |
| 0 | 0 | 1 | 0 | 1 | 0 A/C | 1 | Don't care-default A/C |
| 0 | 0 | 1 | 1 | 0 | 1 B/D | 0 | |
| 0 | 0 | 1 | 1 | 1 | 0 A/C | 1 | Don't care-default A/C |
| 0 | 1 | 0 | 0 | 0 | 0 A/C | 0 | Conflict-default A/C |
| 0 | 1 | 0 | 0 | 1 | 1 B/D | 0 | |
| 0 | 1 | 0 | 1 | 0 | 1 B/D | 0 | |
| 0 | 1 | 0 | 1 | 1 | 1 B/D | 1 | |
| 0 | 1 | 1 | 0 | 0 | 0 A/C | 1 | |
| 0 | 1 | 1 | 0 | 1 | 0 A/C | 1 | Don't care-default A/C |
| 0 | 1 | 1 | 1 | 0 | 1 B/D | 0 | |
| 0 | 1 | 1 | 1 | 1 | 1 B/D | 1 | |

TABLE 3b

| Head Mx | FP A/C | EF A/C | FP B/D | EF B/D | Select | EF Out | Comments |
|---|---|---|---|---|---|---|---|
| 1 | 0 | 0 | 0 | 0 | 1 B/D | 0 | |
| 1 | 0 | 0 | 0 | 1 | 1 B/D | 1 | |
| 1 | 0 | 0 | 1 | 0 | 1 B/D | 1 | Conflict-default B/D |
| 1 | 0 | 0 | 1 | 1 | 1 B/D | 1 | |
| 1 | 0 | 1 | 0 | 0 | 1 B/D | 0 | |
| 1 | 0 | 1 | 0 | 1 | 1 B/D | 1 | Don't care-default B/D |
| 1 | 0 | 1 | 1 | 0 | 0 A/C | 1 | |
| 1 | 0 | 1 | 1 | 1 | 1 B/D | 1 | Don't care-default B/D |
| 1 | 1 | 0 | 0 | 0 | 1 B/D | 0 | Don't care-default B/D |
| 1 | 1 | 0 | 0 | 1 | 0 A/C | 0 | |
| 1 | 1 | 0 | 1 | 0 | 0 A/C | 0 | |
| 1 | 1 | 0 | 1 | 1 | 0 A/C | 0 | |
| 1 | 1 | 1 | 0 | 0 | 1 B/D | 0 | |
| 1 | 1 | 1 | 0 | 1 | 1 B/D | 1 | Don't care-default B/D |
| 1 | 1 | 1 | 1 | 0 | 0 A/C | 1 | |
| 1 | 1 | 1 | 1 | 1 | 0 A/C | 1 | |

I claim:

1. Data processing apparatus for processing data representing fields of a video signal, said data being recorded in a spatially and temporally demultiplexed manner on a recording medium and replayed by means of a plurality of replay heads, wherein said replay heads are organised in groups and where each group comprises a plurality of said replay heads connected in common to a head channel, and wherein said data processing apparatus comprises:

a plurality of first multiplexer means, each said first multiplexer means being connected to a respective said head channel and being responsive to field information included in first control information for multiplexing data relating to a plurality of data processing channels from said replay heads of a said head channel, said first control information being recorded on said recording medium with data to be multiplexed; and second multiplexer means connected to receive an output of each of said first multiplexer means, said second multiplexer means being responsive to second control information to selectively multiplex data between said head channels to separate data into respective ones of said data processing channels, said second control information including information recorded on said recording medium with said data to be multiplexed.

2. Apparatus as claimed in claim 1 wherein:

data is recorded in tracks on said recording medium with a plurality of data processing channels being recorded on respective portions of a said track;

each replay head replays data relating to a plurality of said data processing channels; and each said first multiplexing means additionally multiplexes data relating to a plurality of said data processing channels from each said head of said head channel in response to said first control information.

3. Apparatus as claimed in claim 1 wherein said second multiplexer means comprises a logic circuit responsive to signals representing said second control information and a selector circuit connected to receive said output of each of said first multiplexer means and responsive to an output of said logic circuit, said logic circuit controlling the selection of data from said first multiplexer means by said selector circuit in accordance with said second control information.

4. Apparatus as claimed in claim 1 wherein each said first multiplexer means is responsive to first control information which identifies the location of said data on that medium.

5. Apparatus as claimed in claim 1 for multiplexing data relating to fields of data recorded in tracks with data for two data processing channels being recorded on respective portions of a track on said recording medium and replayed by four heads (A, B, C and D), with two heads (A/C; B/D) connected to each of two said head channels, wherein a source of the data for a data processing channel on said recording medium over an eight field sequence is defined by the following table:

| Field number | : 0 1 2 3 4 5 6 7 |
|---|---|
| 1st level | : 0 1 1 0 0 1 1 0 |
| 2nd level | : 0 0 1 1 0 0 1 1 |
| 3rd level | : 0 0 0 0 1 1 1 1 | where:
said first level relates to the portion of a track—"0" represents the same portion of the track as for field 0 and "1" represents the other portion;
said second level relates to said heads of a head channel—"0" represents a same head as for field 0 and "1" represents another head of a head channel;
said third level relates to said head channels—"0" represents a same head channel as field 0 and "1" represents another head channel; and
said first and second level multiplexing is performed by two first multiplexer means, each for a respective head channel and the third level multiplexing is performed by said second multiplexer means.

6. Apparatus as claimed in claim 1 further comprising a plurality of buffer memories, each buffer memory being connected to a respective first multiplexer means for receiving an output thereof, said second multiplexer means being connected to said buffer memories for selectively accessing a content thereof.

7. Apparatus as claimed in claim 1 wherein data is stored in compressed form on said recording medium, said means for processing data in respective data processing channels includes means for decompressing said compressed data and for concealing errors and said means for recombining processed data to form output data includes interpolation means.

8. Data processing apparatus for processing data representing fields of a video signal, said data being recorded in a spatially and temporally demultiplexed manner on a recording medium and replayed by means of a plurality of replay heads, wherein said replay heads are organised in groups and where each group comprises a plurality of said replay heads connected in common to a head channel, and wherein said data processing apparatus comprises:

a plurality of first multiplexer means, each said first multiplexer means being connected to a respective said head channel and being responsive to field information included in first control information for multiplexing data relating to a plurality of data processing channels from said replay heads of a said head channel, said first control information being recorded on said recording medium with data to be multiplexed; and second multiplexer means connected to receive an output of each of said first multiplexer means, said second multiplexer means being responsive to second control information to selectively multiplex data between said head channels to separate data into respective ones of said data processing channels, said second control information including information recorded on said recording medium with said data to be multiplexed, said second control information also including information identifying a frame pair within a sequence of frames to which said data relates, information identifying erroneous data and a control signal identifying an inversion of the multiplexing sequence.

9. Apparatus as claimed in claim 8 wherein each said first multiplexer means extracts from replayed data, information identifying a field, frame and frame pair from the sequence of fields of video to which said replayed data relates.

10. Apparatus as claimed in claim 8 wherein each said first multiplexer means comprises error correction means for performing error correction, where possible, on data retrieved from said recording medium, and for producing the information identifying erroneous data where error correction was unsuccessful.

11. Apparatus as claimed in claim 8 wherein said control signal identifying an inversion of said multiplexing sequence is derived from a signal external to said data processing apparatus, which external signal defines an output field data rate.

12. Digital video tape replay apparatus comprising a tape transport including a plurality of heads on a rotating head mechanism for recording and/or replaying a tape with slanting tracks which extend diagonally across the tape and data processing apparatus for processing data representing fields of a video signal, said data being recorded in a spatially and temporally demultiplexed manner on a tape and replayed by means of a plurality of replay heads, wherein said replay heads are organised in groups and where each group comprises a plurality of said replay heads connected in common to a head channel, and wherein said data processing apparatus comprises:

a plurality of first multiplexer means, each said first multiplexer means being connected to a respective said head channel and being responsive to field information included in first control information for multiplexing data relating to a plurality of data processing channels from said replay heads of a said head channel, said first control information being recorded on said tape with data to be multiplexed; and second multiplexer means connected to receive an output of each of said first multiplexer means, said second multiplexer means being responsive to second control information to selectively multiplex data between said head channels to separate data into respective ones of said data processing channels, said second control information including information recorded on said tape with said data to be multiplexed.

13. Apparatus as claimed in claim 12 wherein:
data is recorded in tracks on said tape with a plurality of data processing channels being recorded on respective portions of a said track;
each replay head replays data relating to a plurality of said data processing channels; and
each said first multiplexing means additionally multiplexes data relating to a plurality of said data processing channels from each said head of said head channel in response to said first control information.

14. Apparatus as claimed in claim 12 wherein said second multiplexer means comprises a logic circuit responsive to signals representing said second control information and a selector circuit connected to receive said output of each of said first multiplexer means and responsive to an output of said logic circuit, said logic circuit controlling the selection of data from said first multiplexer means by said selector circuit in accordance with said second control information.

15. Apparatus as claimed in claim 13 wherein each said first multiplexer means is responsive to first control information which identifies the location of said data on that tape.

16. Apparatus as claimed in claim 12 for multiplexing data relating to fields of data recorded in tracks with data for two data processing channels being recorded on respective portions of a track on said tape and replayed by four heads (A, B, C and D), with two heads (A/C; B/D) connected to each of two said head channels, wherein a source of the data for a data processing channel on said tape over an eight field sequence is defined by the following table:

| Field number | : 0 1 2 3 4 5 6 7 |
|---|---|
| 1st level | : 0 1 1 0 0 1 1 0 |
| 2nd level | : 0 0 1 1 0 0 1 1 |
| 3rd level | : 0 0 0 0 1 1 1 1 | where:
  said first level relates to the portion of a track—"0" represents the same portion of the track as for field 0 and "1" represents the other portion;
  said second level relates to said heads of a head channel—"0" represents a same head as for field 0 and "1" represents another head of a head channel;
  said third level relates to said head channels—"0" represents a same head channel as field 0 and "1" represents another head channel; and
  said first and second level multiplexing is performed by two first multiplexer means, each for a respective head channel and the third level multiplexing is performed by said second multiplexer means.

17. Apparatus as claimed in claim 12 comprising a plurality of buffer memories, each buffer memory being connected to a respective first multiplexer means for receiving an output thereof, said second multiplexer means being connected to said buffer memories for selectively accessing a content thereof.

18. Apparatus as claimed in claim 12 further wherein data is stored in compressed form on said tape, said means for processing data in respective data processing channels includes means for decompressing said compressed data and for concealing errors and said means for recombining processed data to form output data includes interpolation means.

19. Digital video tape replay apparatus comprising a tape transport including a plurality of heads on a rotating head mechanism for recording and/or replaying a tape with slanting tracks which extend diagonally across the tape and data processing apparatus for processing data representing fields of a video signal, said data being recorded in a spatially and temporally demultiplexed manner on a tape and replayed by means of a plurality of replay heads, wherein said replay heads are organised in groups and where each group comprises a plurality of said replay heads connected in common to a head channel, and wherein said data processing apparatus comprises:

a plurality of first multiplexer means, each said first multiplexer means being connected to a respective said head channel and being responsive to field information included in first control information for multiplexing data relating to a plurality of data processing channels from said replay heads of a said head channel, said first control information being recorded on said tape with data to be multiplexed; and second multiplexer means connected to receive an output of each of said first multiplexer means, said second multiplexer means being responsive to second control information to selectively multiplex data between said head channels to separate data into respective ones of said data processing channels, said second control information including information recorded on said tape with said data to be multiplexed, said second control information also including information identifying a frame pair within a sequence of frames to which said data relates, information identifying erroneous data and a control signal identifying an inversion of the multiplexing sequence.

20. Apparatus as claimed in claim 19 wherein each said first multiplexer means extracts from replayed data, information identifying a field, frame and frame pair from the sequence of fields of video to which said replayed data relates.

21. Apparatus as claimed in claim 19 wherein each said first multiplexer means comprises error correction means for performing error correction, where possible, on data retrieved from said tape, and for producing the information identifying erroneous data where error correction was unsuccessful.

22. Apparatus as claimed in claim 19 wherein said control signal identifying an inversion of said multiplexing sequence is derived from a signal external to said data processing apparatus, which external signal defines an output field data rate.

* * * * *